United States Patent

Lin et al.

[11] Patent Number: 5,912,620
[45] Date of Patent: Jun. 15, 1999

[54] COMBINED TYPE INTRUSION AND ATTACK SENSING MEANS

[75] Inventors: Chao-Ting Lin, Kao Hsiung; Sheng-Hsiung Lin, Ping Tung Hsien, both of Taiwan

[73] Assignee: Lite-On Automotive Corp., Kaohsiung, Taiwan

[21] Appl. No.: 08/989,268

[22] Filed: Dec. 11, 1997

[51] Int. Cl.$^6$ .................................................. G08B 13/18
[52] U.S. Cl. .................... 340/554; 340/541; 340/566; 340/574; 342/28; 342/99
[58] Field of Search .................................. 340/541, 552, 340/554, 565, 566, 567, 573, 574; 367/94; 342/28, 98, 99, 101

[56] References Cited

U.S. PATENT DOCUMENTS

| | | | |
|---|---|---|---|
| 3,760,400 | 9/1973 | Galvin et al. | 340/554 |
| 4,129,856 | 12/1978 | Humphries | 340/554 |
| 5,684,458 | 11/1997 | Calvarese | 340/554 |

Primary Examiner—Daniel J. Wu
Attorney, Agent, or Firm—Rosenberg, Klein & Bilker

[57] ABSTRACT

A combined type intrusion and attack sensing device was a microwave oscillation and Doppler detect circuit an intrusion band-pass filter, an attack band-pass filter, two comparators, two alarm driving circuits, and a suspended object. The combined type intrusion and attack sensing device adopts the Doppler effect to sense an intrusion and employs a microwave antenna to transmit a signal in the microwave band within a predetermined range. The signal will be reflected by any object within above range or suspended object vibration, and the reflected wave will be received by the antenna. The reflected wave will be mixed with original signal to generate a difference-frequency signal. The difference-frequency signal is amplified by an intrusion band-pass filter or an attack band-pass filter. The amplified and filtered signal is sent to two comparator circuits for comparison with a reference signal to generate two driving signals to drive one of the two alarm-generating circuits. The driven alarm-generating circuit will raise an alarm to help prevent burglary.

6 Claims, 3 Drawing Sheets

COMBINED TYPE INTRUSION AND ATTACK SENSING MEANS

BACKGROUND OF THE UTILITY

The present utility relates generally to a combined type intrusion and attack sensing means, more particularly to an intrusion and attack means which combine the sensing methods of microwave sensing and shock sensing.

The present burglarproof means generally adopts the microwave and the Doppler effect to sense an intrusion. As shown in FIG. 1, the conventional microwave sensing means employs a microwave antenna ANT to transmit a signal with frequency in the microwave band within a predetermined range. The signal will be reflected by any object moving within above range and the reflected wave will be received by the antenna ANT. The reflected wave subjected to the Doppler effect will be mixed with original signal to generate a difference-frequency signal. The difference-frequency signal is amplified by a band pass filter 2 to amplify the specific frequency range required. The amplified and filtered signal is sent to a comparator circuit for comparison with a reference threshold to generate a trigger signal to drive the alarm-generating circuit. The alarm-generating circuit will raise an alarm in case of intrusion. Alternatively, The attack of the burglar can be sensed by a shock sensing method. However, above two sensing means operate independently, and the intrusion and attack means with a function of combining microwave sensing and shock sensing is not yet available.

In view of above problems, the preset utility is intended to provide an intrusion and attack means which combine microwave sensing and shock sensing.

BRIEF DESCRIPTION OF THE DRAWING

In order to better understand the present utility, reference should be made to the following detailed description taken in junction with the accompanying drawing wherein.

DETAILED DESCRIPTION OF THE UTILITY

Figure 1:
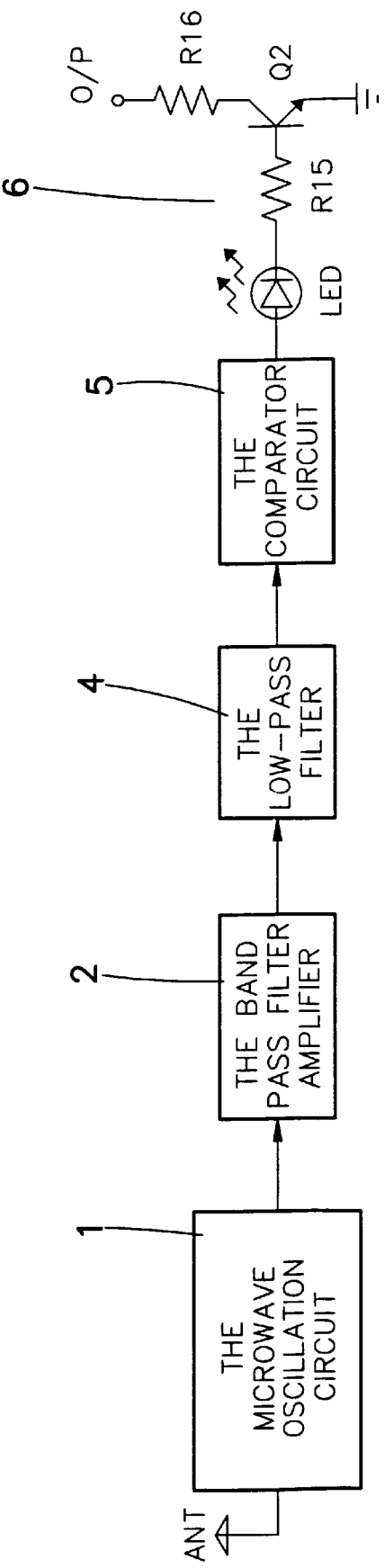
FIG. 1 is circuit diagram of a conventional burglar detection means adopting the microwave sensor method only.
Figure 2:
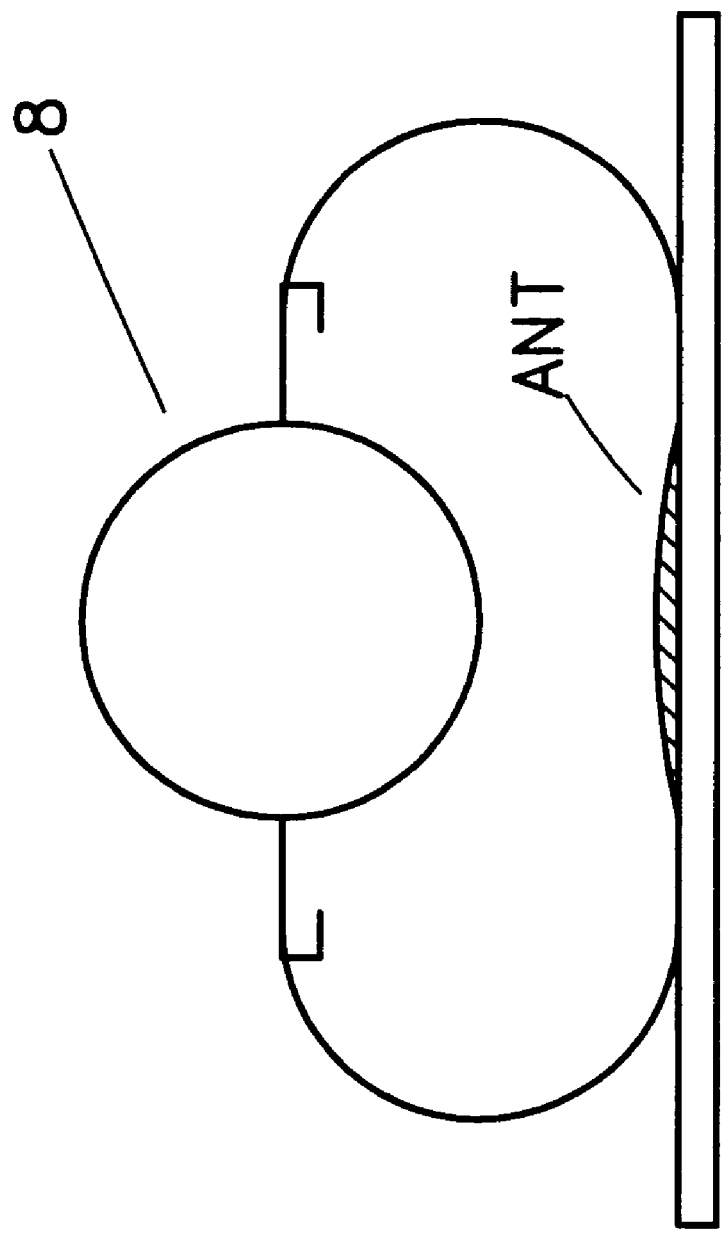
FIG. 2 is the circuit diagram of the present utility.
Figure 3:
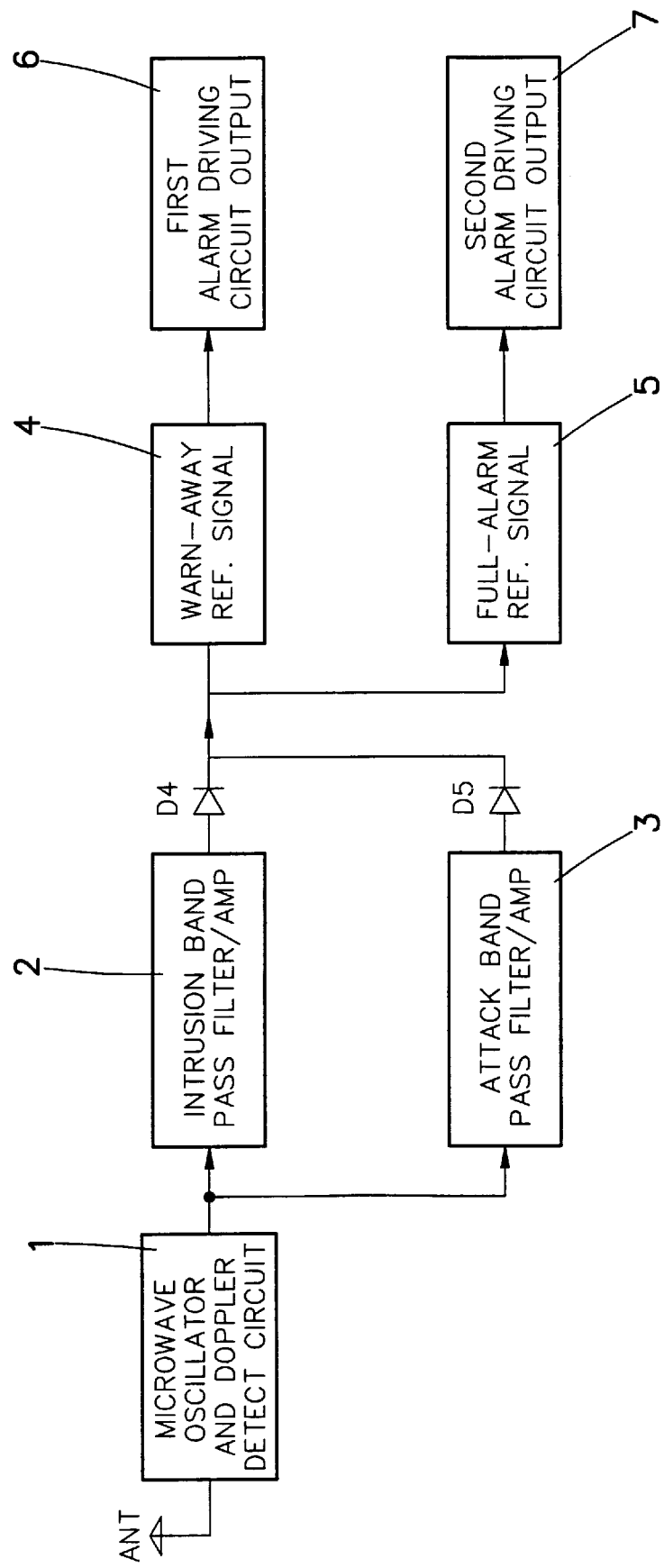
FIG. 3 is the scheme diagram of components of the present utility.

As shown in FIG. 2 and FIG. 3, the combined type intrusion and attack sensing means provided by the present utility comprises a microwave oscillator and Doppler detecting circuit 1, an intrusion sensitive band-pass filter 2, a separate attack sensitive band-pass filter 3, a first comparator 4, a second comparator 5, a first alarm driving circuit output 6, a second alarm driving circuit output 7, a microwave antenna ANT, and a suspended object 8 wherein:

the microwave oscillator and Doppler detecting circuit 1 has an input end connected to a microwave antenna which sending microwave with frequency in the microwave band within a predetermined range such that the wave will be reflected by any object within above range or suspended object 8 vibration, and have a frequency shift due to Doppler effect, thereby, the reflected wave can be mixed with original signal to generate a difference-frequency signal;

the suspended object 8 is a weight object and suspended with a flexible mount so the weight can have inertia to be independent of initial shock motion and thereby appear as an object detectable in a Doppler sensing device, moreover, the suspended object 8 has appropriate size and distance from the antenna of the sensing means and can be used to simulate a corresponding object many times larger and further away, to create a comparable signal level that the sensing circuit is designed to require for operation of another, or plurality of other sensing functions, the suspended object 8 assembly can be designed using a variety materials to perform the function of creating an inertia reactive signal in all 3 axis and where the construction and weight of the suspended object 8 will have a selective mechanical resonance frequency different than that generated throng normal microwave intrusion;

the intrusion sensitive band-pass filter 2 is connected to the output of the microwave oscillator and Doppler detecting circuit 1 and functioned to receive and amplify the difference-frequency signal, the output of the intrusion sensitive band-pass filter 2 is connected to the anode of a diode D4;

the attack sensitive band-pass filter 3 is connected to the output of the microwave oscillator and Doppler detecting circuit 1 and functional to receive and amplify the difference-frequency signal output from the microwave oscillator and Doppler detecting circuit 1, the output of attack sensitive band-pass filter 3 is connected to the anode of the diode D4 through a diode D5;

the comparator circuits 4 and 5 are connected to the output diode D4 and D5, respectively, with their outputs connected to the first alarm driving circuit output 6 and second alarm driving circuit output 7, respectively, the comparator circuits 4 and 5 are functioned to compare the output signal of the intrusion sensitive band-pass filter 2 and the attack sensitive band-pass filter 3 with warn-away and full-alarm reference signal, respectively, and generate a trigger signal for driving first alarm driving circuit output 6 and second alarm driving circuit output 7 in case of intrusion/attack, and there are different sound effects for this two situations.

More specifically, the above-mentioned suspended object has a distinct mechanical resonance frequency to separate the intrusion signal characteristics from the attach characteristics for separate processing, and the suspended object is such mounted that it has equal freedom to move in three axis and remains sensitive to shock type attacks in all direction.

As previous description, the combined type intrusion and attack sensing means provided by the present utility adopts the Doppler effect to sense an intruder and employs an microwave antenna to transmit a signal with a frequency in the microwave range within a predetermined range. The signal will be reflected by any object moving within above range or suspended object vibration and received by the antenna. The reflected wave will be mixed with original signal to generate a difference-frequency signal. The difference-frequency signal is amplified by an intrusion band-pass filter amplifier or an attack band-pass filter amplifier. The amplified and filtered signals are sent to two comparator circuits for comparison with warn-away and full alarm threshold reference levels to trigger the first and second drive circuits. The alarm-generating circuit will raise an alarm to discourage a potential burglar.

While this utility has been described in connection with what is presently considered to be the most practical and preferred embodiment, it is to be understood that the utility is not limited to the disclosed embodiment and has various modifications. For example, the Doppler signal characteristics of other attack method, such as, but not limited to, glass breakage, may also be filtered and amplified separately from those other identified, allowing further expansion of sensor type. Moreover, each independent signal type can be conditioned into a pulse width with increasing time proportional to severity and be provided to a control circuit for further processing of the degree of intrusion and attack levels, thereby allowing decisions for no alarm response, or warning levels of response, or full triggered alarm response. Therefore, the present utility is intended to cover various modifications and equivalent arrangements included within the spirit and scope of the appended claims.

What is claimed is:

1. A combined type intrusion and attack sensing means which adopts the microwave sensing method and shock sensing method simultaneously and comprises:

a microwave oscillator and Doppler detecting circuit having an output end connected to a microwave antenna emitting a microwave within a predetermined range such that the wave will be reflected by any object within said range or suspended object vibration and have a frequency shift due to Doppler effect thereby, the reflected wave can be mixed with original signal to generate a difference-frequency signal;

an intrusion sensitive band-pass filter connected to the output of said microwave oscillator and Doppler detecting circuit and functioned to receive and amplify said difference-frequency signal output from said microwave oscillator and Doppler detecting circuit;

an attack sensitive band-pass filter connected to the output of said microwave oscillator and Doppler detecting circuit and functioned to receive and amplify said difference-frequency signal output from said microwave oscillator and Doppler detecting circuit;

two comparator circuits with input connected to the output of said intrusion sensitive band-pass filter and attack sensitive band-pass filter, respectively, and function to compare the output of said intrusion sensitive band-pass filter and attack sensitive band-pass filter with its associated reference signal and generate trigger signal for alarm driving circuit of intrusion or attack.

2. A combined type intrusion and attack sensing means as in claim 1, wherein said suspended object has appropriate size and distance from said antenna of said detecting circuit and can be used to simulate a corresponding object many times larger and further away, to create a comparable signal level that said sensing circuit is designed to require for operation of another, or plurality of other detecting functions.

3. A combined type intrusion and attack sensing means as in claim 1, wherein the suspended object is a weight object and suspended with a flexible mount so the weight has inertia to be independent of initial shock motion and thereby appear as an object detectable in a Doppler sensing device.

4. A combined type intrusion and attack sensing means as in claim 1, wherein the suspended object has a distinct mechanical resonance frequency to separate the intrusion signal characteristics from the attack characteristics for separate processing.

5. A combined type intrusion and attack sensing means as in claim 1, wherein the suspended object is such mounted that it has equal freedom to move in three axis and remains sensitive to shock type attacks in all direction.

6. A combined type intrusion and attack sensing means as in claim 1, wherein each independent signal type can be conditioned into a pulse width with increasing time proportional to severity and be provided to a control circuit for further processing of the degree of intrusion and attack levels, thereby allowing decisions for no alarm response, or warning levels of response, or full triggered alarm response.

\* \* \* \* \*